United States Patent [19]

Sarda et al.

[11] Patent Number: 5,232,617
[45] Date of Patent: Aug. 3, 1993

[54] PROCESS FOR THE PREPARATION OF HEXAFERRITES

[75] Inventors: Christian Sarda, Toulouse; Abel Rousset, Ramonville; Paul Mollard, Domene, all of France

[73] Assignee: Centre National De La Recherche Scientifique, Paris, France

[21] Appl. No.: 681,678

[22] Filed: Apr. 8, 1991

[30] Foreign Application Priority Data

Apr. 9, 1990 [FR] France .................. 90 04531

[51] Int. Cl.$^5$ .................................. C04B 35/26
[52] U.S. Cl. ........................ 252/62.6; 252/62.62; 252/62.63; 423/594; 427/127; 427/128; 427/215
[58] Field of Search ............. 252/62.6, 62.62, 62.63; 423/594; 427/127, 128, 215

[56] References Cited

U.S. PATENT DOCUMENTS

| | | |
|---|---|---|
| 3,634,254 | 11/1972 | Micheli .................. 252/62.63 |
| 4,512,906 | 4/1985 | Hayakawa et al. ........ 252/62.63 |
| 4,671,885 | 6/1987 | Gaud et al. ............. 252/62.63 |
| 4,781,852 | 11/1988 | Kaczur et al. ........... 252/62.63 |
| 4,803,291 | 2/1989 | Rousset et al. .......... 252/62.63 |

FOREIGN PATENT DOCUMENTS

| | | |
|---|---|---|
| 01798269 | 4/1986 | European Pat. Off. . |
| 0223050 | 5/1987 | European Pat. Off. . |
| 0297392 | 1/1989 | European Pat. Off. . |
| 63-64307 | 3/1988 | Japan .................... 252/62.63 |

OTHER PUBLICATIONS

Chemical Abstracts, vol. 88, No. 26, Jun. 1978, p. 666, No. 201142p, Oh et al, "Particle growth of barium ferrite prepared by coprecipitation as oxalate and thermal decomposition".
French Search Report of FR 90 04531.

Primary Examiner—Jack Cooper
Attorney, Agent, or Firm—Cushman, Darby & Cushman

[57] ABSTRACT

A process for preparing hexaferrite particles of the type $M'Fe_{12}O_{19}$ wherein $M'$ represents principally an alkaline earth metal involves preparing a particulate mixture of a ferrous salt of an organic acid and a salt of an organic acid with at least one metal $M'$, optionally with at least one dopant agent, the particles of the mixture having a size not greater than about 0.5 μm and the said mixture containing a stoichiometric excess of the salt of metal $M'$. This mixture is heated up to the decomposition of the organic salts and the resulting product is submitted to a thermal treatment at a temperature at least equal to 700° C. but not greater than 1000°C. and is maintained at this temperature for a period of time sufficient to form hexaferrite. After cooling the resulting particles are washed with an aqueous solution of an acid capable of dissolving formed monoferrites of the type $M'Fe_2O_4$ to remove them.

22 Claims, No Drawings

PROCESS FOR THE PREPARATION OF HEXAFERRITES

The present invention relates to a process for preparing hexaferrite particles, optionally modified by doping.

It is known that hexaferrites, such as barium hexaferrite of the type $BaFe_{12}O_{19}$, crystallize in the form of hexagonal platelets having interesting magnetic properties and principally a high coercive field and significant residual and saturation magnetization. They can be employed in the production of permanent magnets in the form of ceramics. In the form of particles, in admixture with a binding agent, they can be used in the production of articles such as magnetic cards or magnetic tickets, capable of containing, in a permanent fashion, magnetically recorded information which is practically unalterable by reason of high coercivity.

On the addition of appropriate dopants, hexaferrite particles having a weaker coercive field can be obtained and employed, principally, in perpendicular and longitudinal magnetic recording.

The hexaferrite particles must have a size not exceeding about 1 $\mu$m, far beyond that the particles are no longer monofield and a loss of magnetic properties is observed. The term "size" here means the greatest distance between any two points of a particle.

Moreover, the particles must not have a size smaller than 0.05 $\mu$m, for they then become superparamagnetic which also involves a significant loss of magnetic properties.

In fact, it is known that optimum magnetic properties are obtained with particles having a size in the order of 0.2 to 0.5 $\mu$m, and it is interesting to use the smallest particles possible in order to increase the storage density of magnetically recorded information.

The hexaferrite particles of the type indicated above can be prepared in various ways: solid state reaction of iron oxide and barium carbonate; coprecipitation of oxy-hydroxides starting with barium salts and iron salts in a basis medium, followed by a solid state reaction; production in a salt flux or in a glass; hydrothermal synthesis; etc.

For a review of various advantages and disadvantages of these known methods, see, for instance, the discussion appearing in U.S. Pat. No. 4,664,831.

One of the difficulties encountered in the synthesis of hexaferrite particles is the attainment of a homogeneous distribution of particle sizes.

Moreover, all known methods generally require thermal treatments or high temperature annealing, so that it is difficult to avoid interparticle agglomerations or calcination. It is not desirable to remedy this disadvantage using a final grinding of particles because there is then experienced an alteration of the magnetic properties. Specialists in the field often cite these problems by saying that the hexaferrites "are difficult to disperse".

The present invention relates to the preparation of barium, calcium, strontium or lead hexaferrite particles or mixed hexaferrites of these metals, by a solid state reaction of organic salts of these metals with organic salts of iron. This process is easily operated industrially. It permits to obtain particles in the form of hexagonal platelets having the required size, with a narrow particle size distribution and, without interparticle agglomeration or calcination.

The present invention, which was made in the laboratory of Chimie des Materiaux Inorganic de l'Univerisite Paul Sabatier, Toulouse 111, France, a laboratory associated with the Centre National de la Recherche Scientifique, thus relates to a process for preparing hexaferrite particles of the type $M'Fe_{12}O_{19}$, M' representing at least one metal selected from barium, strontium, calcium and lead, optionally modified by a dopant agent. The non-doped hexaferrite particles, obtained by the process of the present invention, have a coercive field and high saturation and residual magnetizations. The particles obtained according to this process can also be modified by dopants, and can, in certain instances, have an iron oxide, gamma-$Fe_2O_3$, core.

The process of the present invention comprises, principally:

preparing a particulate mixture of a ferrous salt of an organic acid and a salt of an organic acid with at least one metal M', such as defined above, and optionally one or more dopant agents, the particles of the mixture having a size not greater than about 0.5 $\mu$m, the said mixture containing a stoichiometric excess of the salts of metal M';

heating the said mixture until the organic salts decompose;

submitting the resulting product to a thermal treatment at a temperature at least equal to 700° C. and not greater than 1000° C., and maintaining said temperature for a time sufficient to obtain the formation of the hexaferrite; and after cooling, the resulting particles are then washed with an aqueous solution of an acid capable of dissolving monoferrites of the type $M'Fe_2O_4$ which are formed, so as to remove said monoferrites.

In the process of the present invention, the particles can take any form, but these particles, principally the particles of iron salt, are preferably non-acicular or slightly acicular, with an acicular ratio lower than 3 and, in particular, not greater than 2.

It is recalled that the acicular ratio is defined in the following manner: for a particle having a general ellipsoidal form wherein L is its length (axial) and d is its diameter (the largest diameter of the ellipsoid in a plane perpendicular to the axis): the acicular ratio is the ratio L/d.

The organic acid salts of iron (II) and metal M' are salts of an organic carboxylic acid. These are, for example, acetates, formates, citrates, tartrates and oxalates.

The ferrous salts are preferably salts which are insoluble or slightly soluble in water and which can be obtained by admixing with salts of the metal M' by a coprecipitation reaction which assists in the attainment of a homogeneous salt mixture.

Representative ferrous salts that are obtained in admixture with the salts of metal M', by coprecipitation, include, principally, the oxalates, the citrates and the tartrates, the oxalates actually being preferred.

Although the preparation of $M'Fe_{12}O_{19}$ theoretically requires about 0.08 mole of metal M' per mole of iron, there is employed in the process of the present invention, an excess of metal M' (in salts form). The excess of metal M' is such that the starting particulate mixture contains at least 0.1 mole, and in particular, at least 0.12 mole of metal M' per mole of iron. Preferably, this excess is such that the final product (before acid washing) contains from about 1 to 4 moles of $M'Fe_2O_4$, or even more, per mole of $M'Fe_{12}O_{19}$. In practice, the starting mixture of salts contains from 0.14 to 0.30, and in particular from about 0.14 to 0.25 mole of metal M' per mole of iron.

It is appropriate to note that it was not obvious to obtain, with this excess of metal M', M'Fe$_{12}$O$_{19}$ hexaferrites (in admixture with M'Fe$_2$O$_4$ monoferrites). The expectation, in effect, would be to obtain compounds intermediate between the monoferrites and the hexaferrites. Such intermediate compounds, in the form of defined compounds (monophased), have already been described in the literature.

The heating rate during the organic salt decomposition step is a sufficiently slow rate so as to avoid degrading and/or agglomerating the particles; this heating rate is, for example, from 10°–20° C./hour; the evolution of the salt decomposition can be followed by differential thermal analysis and by gravimetry, which permits to determine easily, in each case, the decomposition temperature.

The heating rate during the thermal treatment consecutive to the salt decomposition is, for example, from 100°–200° C./hour. It is possible to heat at a slower rate: the duration of the final stage can then be reduced. This thermal treatment must not be effected at a temperature greater than 1000° C., for then the resulting particles have too significant a size. The thermal treatment can be carried out directly following the salt decomposition treatment; it can also be carried out on particles having been cooled after the decomposition step.

Study by thermal and radiocrystallographic analysis of the reactions, operated in the process described above, has shown that after decomposition of the mixture of salts, iron oxide Fe$_2$O$_3$ and a monoferrite M'Fe$_2$O$_4$ are obtained.

The formation of the hexaferrite results then from a slow kinetic reaction of the type:

M'Fe$_2$O$_4$ + 5 Fe$_2$O$_3$ → M'Fe$_{12}$O$_{19}$  (reaction 1)

It appears that the process permits the formation, at the surface of the iron oxide particles, of a phase rich in metal M' (M'Fe$_2$O$_4$ phase) which diffuses towards the interior of the particle by giving place to reaction (1) indicated above.

The iron oxide Fe$_2$O$_3$ obtained after decomposition of the starting iron salt can be, according to the case, in the form of gamma-Fe$_2$O$_3$ or alpha-Fe$_2$O$_3$. It is known that the temperature of transformation of the gamma or alpha form is in the order of about 500° C. But it has been noted that the presence of ions of metal M' in the particles stabilize the gamma form; in other words, this temperature of transformation is occasionally increased to above 700° C. Benefit can be secured from this phenomenon so as to obtain, if desired, gamma-Fe$_2$O$_3$ particles coated with a layer of hexaferrite (doped or not). It is possible to obtain such particles with systems for which, with a sufficient excess of metal M', the temperature of transformation gamma→alpha is greater than the temperature of transformation of hexaferrite in the system considered: it suffices then to effect the thermal treatment at a temperature lower than the said temperature of transformation. In other cases, the core of the particles contain, during the thermal treatment, iron oxide in the alpha form and it is then required to continue the thermal treatment for a time sufficient to permit the complete reaction of iron oxide (that is to say the disappearance of the iron oxide phase) since the alpha form does not have interesting magnetic properties.

The thermal treatment has then for an object to heat the particles to a temperature sufficient to permit reaction (1) to occur. For each system employed, the final temperature of the thermal treatment can easily be determined by following the formation of hexaferrite by radiocrystallography. Preferably, this temperature is selected in the range 750°–950° C. The thermal treatment comprises then a staging, that is to say, the mixture is maintained at the chosen temperature for a time sufficient so that the diffraction rays corresponding to iron oxide (alpha or gamma according to the case) disappear if a total reaction is desired, i.e. it is desired to prepare particles composed exclusively of hexaferrite (optionally modified by a dopant). If when it is possible (as indicated earlier), it is desired to prepare hexaferrite particles with a core of gamma-Fe$_2$O$_3$, the thermal treatment is then effected at a temperature lower than the temperature of transformation gamma→alpha in the system considered. In this case the thermal treatment is terminated before the complete disappearance of the gamma Fe$_2$O$_3$ phase, that is to say before the complete disappearance of the diffraction rays corresponding to gamma Fe$_2$O$_3$. The duration of this stage can be easily determined by simple routine experiments, by using as criteria, on the other hand the persistence of a certain amount of gamma Fe$_2$O$_3$ and on the other hand the desired magnetic properties of the final product.

In all cases the duration of the staging can be all the more reduced as the final temperature is the higher. For example, for barium hexaferrite, there can be employed stagings of about 20 hours at 900° C. or of about 15 hours at 950° C. Besides the greater the excess of metal M is, the more the temperature and/or the duration of the staging can be reduced. The duration of the stage is generally from 10 to 20 hours.

The decomposition of the salts is carried out in an oxidizing atmosphere, so as to permit the oxidation of ferrous iron to ferric iron. This step can be carried out in, for example, air. The thermal treatment which follows the decomposition can also be carried out in air and can be effected, for example, in fluidized bed furnaces or in rotating furnaces.

At the end of the thermal treatment, the resulting particulate mixture is cooled, for example, at a cooling rate of 200° C./hour.

In addition to the principal constituent (hexaferrite) the resulting particles contain, taking into account the excess of metal M' employed, a certain amount of M'Fe$_2$O$_4$ monoferrite which is principally localized on the surface for the reasons which have been previously indicated.

It is appropriate then to proceed to a final step of removing the monoferrites.

This removal is carried out by washing the particles with an aqueous solution of an acid, for example, a mineral acid. There can easily be determined from routine experimentation, the appropriate acids, for example, hydrochloric acid, and the concentrations of the aqueous washing solutions, that is to say, that concentration permitting to dissolve the monoferrites without considerably dissolving the hexaferrite.

For example in the case of barium hexaferrite, the particles can be contacted with a 6N solution of HCl, with stirring, for 15 minutes.

The acid wash significantly improves the morphology and homogeneity of the particles (principally the particle size distribution) by suppressing particle agglomeration (due essentially to the formation of monoferrite bridges during the thermal treatment).

After treatment with an acid, the particles are generally washed with water to remove residual acid. The particles are then dried.

Preferably, the mixtures of salts, employed as starting products, are prepared by coprecipitation, which provides more homogeneous mixtures which lead to better properties in the final product.

In accordance with a preferred embodiment, the method of preparing, by coprecipitation, the particulate mixture of salts from the starting organic acid comprises:

preparing a solution containing soluble salts of divalent iron and metal M', in appropriate amounts, the total concentration of the salts being greater than 1 mole/liter;

preparing a solution containing from 1 to 2 moles/liter of organic acid in an organic solvent, or in a mixture of water and organic solvent;

pouring, with stirring, the said solution of salts into the said solution of organic acid;

and recovering the formed precipitate.

The organic acid is certainly an organic acid whose ferrous salts and salts of metal M' are practically insoluble in the reaction medium. It is a question principally of oxalic, citric, tartaric acids, etc.

The proportions of iron salt and metal M' salt are those which give, in the precipitate, a sufficient excess of metal M' such as defined previously. These proportions can be easily determined experimentally in each case. Generally, the proportions of soluble salts are such that their mixture contains from 0.50 to 0.65 mole of metal M' per mole of iron.

The solution containing soluble salts of iron and metal M' can be an aqueous solution or a solution in a mixture of water and organic solvent.

The useful organic solvents (in the salt solution and/or in the organic acid solution) are those which provide a coprecipitate in which the salt particles have the requisite characteristics, that is to say a size lower than 0.5 μm and an acicular ratio lower than 3. The choice of these organic solvents can be made by simple routine experimentation. Generally, the organic solvents employed have dielectric constants lower than about 30.

The pouring of the solution of salts into the solution of organic acid must be executed sufficiently rapidly, so as to assist the attainment of particles having a small size in the precipitate. The optimum pouring rate can be determined experimentally. Generally, from about 10% to 20% by volume of the salt solution is poured per minute (or the addition time ranges from 5 to 10 minutes).

The particular embodiment of the preparation of starting salts by coprecipitation can again exhibit the following characteristics taken singly or in combination:

the said solution containing the salts of iron and metal M' also contain a soluble salt of at least one dopant metal;

the starting soluble salts are, for example, mineral salts such as chlorides, nitrates or salts of organic acids, such as formates or acetates;

the solution continuing the said soluble salts is a solution in water or in an organic solvent selected from methanol, ethanol, tetrahydrofuran, and polyols which are liquid at ambient temperature, or in mixtures of water and these solvents, the said solution being optionally acidified to assist the dissolution of the salts;

the solution of starting salts is produced by using for example, as solvent: water, propanol/methanol mixtures, ethanol/water mixtures, propanediol/water mixtures, tetrahydrofuran/water mixtures and water/methanol mixtures;

the organic solvent, in which is dissolved the organic acid, is selected from ethanol, 1-propanol, isopropanol, butanol, acetone, or mixtures of these solvents, with optionally a small amount of water.

As indicated above, the process of the invention permits the preparation of hexaferrite modified by one or more dopants. The dopants are conventional for this type of compounds, and in particular divalent metals such as Co, Ni, Cu, Zn and Fe.

These doped products can be obtained by adding to the mixture of starting organic salts at least one organic salt of a dopant metal, in an appropriate amount.

Preferably, the dopant agent is coprecipitated with the salts of iron and metal M', in accordance with the procedures described above, by adding to the mixture of starting soluble salts a soluble salt of at least one dopant metal. The soluble salts of the dopant are, for example, acetates, chlorides or nitrates.

The amount of dopant employed depends on the metal M' and the dopant. It is a question of an amount less than that for which the final product is no longer monophased, this amount being determined experimentally. Among these doped products, those which exhibit the most favorable magnetic properties for the desired use can be selected.

Generally, the amount of dopant in the final product is less than 4.5 weight percent.

The amounts of soluble salt of the dopant metal added to the mixture of soluble salts of iron and metal M', with the view of obtaining a precipitate having a given composition, can easily be determined experimentally.

However, in the case where it is desired to dope the final product with ferrous iron, the doping method thus described is not appropriate. It is necessary in this case to effect at least one part of the thermal treatment in a slightly reducing atmosphere, for example, under an inert gas atmosphere containing a sufficient amount of hydrogen to reduce a portion of ferric iron to ferrous iron.

The doped products obtained, on account of the process of this invention, exhibit the advantage of having a relatively weak coercive field, compatible with the exigencies for magnetic recording, all while preserving high saturation magnetization and high residual magnetization.

J. A. Kohn and D. W. Eckart, Journal of Applied Physics, Vol. 35, No. 3, p. 968 (1964), have described the existence of monophased compounds whose composition is intermediate between the said phases of type M (of formula M'Fe$_{12}$O$_{19}$) and of type W (of formula M'M''$_2$Fe$_{16}$O$_{27}$, M'' being a divalent metal).

In other words, these intermediate monophased compounds have formula I:

$$(M'Fe_{12}O_{19})_{1-x}, (M'M''_2Fe_{16}O_{27})_x \qquad (I)$$

which corresponds to the gross formula:

$$M'M''_{2x}Fe_{12+4x}O_{19+8x},$$

x being a number between 0 and 1.

Elemental analysis of the doped products, obtained in accordance with the process of the invention, (when the dopant is divalent metal) is compatible with formula I. These doped products are not then truly hexaferrites of type M, but modified hexaferrites whose gross formula is in accord with that of formula I.

On account of the process of the invention, hexaferrite particles can easily be obtained in the form of hexagonal platelets having a diameter of about 0.2 to 0.3 $\mu m$, a diameter/thickness ratio of about 4 to 8, and a specific surface varying generally from about 5 to 10 $m^2/g$, that which is evidenced by the absence of inter-particle fritting.

The non-doped hexaferrite particles, obtained in accordance with the process of the invention, exhibit interesting magnetic properties, principally a high coercive field and significant residual and saturation magnetizations which permit their use principally in the production of magnetic cards or magnetic tickets.

The hexaferrite particles modified by doping, as well as hexaferrite particles, doped or not, having a core of gamma-$Fe_2O_3$, obtained in accordance with the process of the invention, and which constitute one of the objects of the invention, are useful principally in the production of pigments for perpendicular or longitudinal magnetic recording.

The following non-limiting examples illustrate the invention.

EXAMPLE 1

Preparation of barium hexaferrite, $BaFe_{12}O_{19}$ (a) Coprecipitation of Iron and Barium Oxalates In a solution containing 300 $cm^3$ of water, 200 $cm^3$ of 1,2-propanediol and 5 $cm^3$ of 12N HCl, there are dissolved 108 g of $FeCl_2.4H_2O$ and 81 g of $BaCl_2.2H_2O$.

Also a solution of 120 g of oxalic acid in 1400 $cm^3$ of ethanol is prepared.

The solution of salts is then added to the oxalic acid solution, with stirring, at an essentially constant flow such that the addition lasts 7 to 8 minutes.

The resulting precipitate is washed with water, separated by centrifugation and dried.

Analysis of the precipitate by X-ray diffraction evidences the presence of two distinct phases: iron oxalate, $FeC_2O_4.2H_2O$ and barium oxalate, $BaC_2O_4.\frac{1}{2}H_2O$.

Contrary to that which is observed during coprecipitation of transition metals and iron, in the form of oxalates, there is not obtained a single or even a mixed oxalate phase, but rather two distinct phases.

Analysis of micrographs, obtained by transmission electronic microscopy of the particles of the precipitate does not permit making a distinction between the two populations of particles, as concerns their form or size.

The particles have an average length of 0.24 $\mu m$ (standard deviation: 0.07 $\mu m$), and an average diameter of 0.12 $\mu m$ (standard deviation: 0.04 $\mu m$).

The acicular ratio is then equal to 2.

The resulting precipitate contains about 4 moles of iron oxalate per mole of barium oxalate.

(b) Decomposition of the Oxalates

The precipitate obtained in the preceding stage is heated at a slow heating rate (10° C./hour) under an air sweep.

Thermogravimetric analysis shows that the decomposition of the oxalates is terminated towards 400° C.

The mixture is then heated to a temperature of 900° C., at a heating rate of 100° C./hour. This temperature is maintained for 20 hours.

During this thermal treatment, x-ray analysis shows the appearance of a $BaFe_2O_4$ phase and then, in addition, a $BaFe_{12}O_{19}$ phase.

After the thermal treatment, the resulting particle mixture is cooled at a cooling rate of about 200° C./hour.

The resulting product is then washed in a dilute 6N HCl solution for 15 minutes, by using 20 $cm^3$ of solution per gram of product. The product is then washed with water, separated by filtration or centrifugation and dried.

The particles are obtained in the form of hexagonal platelets. Electro analysis by electronic microscopy permits the establishment of granulometric distribution histograms.

The average diameter of the particles is 0.20 $\mu m$ (standard deviation: 0.08 $\mu m$).

The average thickness is 0.05 $\mu m$ (standard deviation: 0.017 $\mu m$).

The average diameter/thickness ratio is 3.9 (standard deviation: 1.2)

Specific surface (B.E.T.): 7.3 $m^2/g$

Magnetic properties:

coercive field: $Hc = 5705$ Oe (454 kA/m)

saturation magnetization $\sigma s$: 68.1 uem/g (68.1 $Am^2/kg$)

residual magnetization $\sigma r$: 34.9 uem/g (34.9 $Am^2/kg$)

ratio ($\sigma r/\sigma s$): 0.51

For comparison, by operating in a manner analogous to that which has been described, but by using only 63 g of barium chloride (dihydrate) per 108 g of hydrated ferrous chloride, with a molar ratio Ba/Fe of 0.475, particles are obtained containing a certain amount of unreacted alpha $Fe_2O_3$, and having the following magnetic characteristics:

Hc: 5430 Oe $\sigma s$: 58.3 uem/g $\sigma r$: 30.1 uem/g

It can be seen that the coercive field, and especially the saturation and residual magnetization values have clearly decreased.

EXAMPLE 2

Preparation of Doped Particles

The procedures set forth in Example 1 are repeated except that there is employed in addition to the starting solution of salts:

(a) either 10 g of $ZnCl_2$, or (b) 10 g of $CoCl_2.6H_2O$, or (c) 4 g of $CoCl_2.6H_2O$ and 4.8 g of $ZnCl_2$ The oxalate precipitates have, respectively, the following compositions:

(a) $((Fe_{0.97}Zn_{0.03})C_2O_4.2H_2O)_{0.8} + (BaC_2O_4.\frac{1}{2}H_2O)_{0.2}$ (b) $((Fe_{0.975}Co_{0.025})C_2O_4.2H_2O)_{0.8} + (BaC_2O_4.\frac{1}{2}H_2O)_{0.2}$ (c) $((Fe_{0.975}Co_{0.01}Zn_{0.015})C_2O_4.2H_2O)_{0.8} + (BaC_2O_4.\frac{1}{2}H_2O)_{0.2}$ The resulting phases (after thermal treatment) correspond respectively to:

(a) $BaFe_2O_4 + [(BaFe_{12}O_{19})_{0.72}.(BaZn_2Fe_{16}O_{27})_{0.28}]$, (b) $BaFe_2O_4 + [(BaFe_{12}O_{19})_{0.75}.(BaCo_2Fe_{16}O_{27})_{0.25}]$, and (c) $BaFe_2O_4 + [(BaFe_{12}O_{19})_{0.58}.(BaCo_2Fe_{16}O_{27})_{0.27}.(BaZn_2Fe_{16}O_{27})_{0.15}]$ After acid washing, the magnetic characteristics are:

(a) Hc = 2853 Oe $\sigma r = 30.2$ uem/g $\sigma s = 59.8$ uem/g (b) Hc=2123 Oe
$\sigma_T$=26 uem/g
$\sigma_s$=65.5 uem/g
(c) Hc=1314 OE
$\sigma_T$=27.6 uem /g
$\sigma_s$=63.4 uem/g

We claim:

1. A process for preparing hexaferrite particles of the type $M'Fe_{12}O_{19}$, optionally modified by a dopant agent, wherein M' represents at least one metal selected from the group consisting of barium, calcium, strontium and lead, said process comprising the steps of
    preparing a particulate mixture of a ferrous salt of an organic acid and a salt of an organic acid with at least one metal M' by coprecipitation, and optionally one or more dopant agents, the particles resulting from said coprecipitation having a size not greater than about 0.5 μm, the said mixture containing a stoichiometric excess of the salt of metal M' and containing from 0.14 to 0.30 mole of metal M' per mole of iron,
    decomposing the resulting organic acid salt by heating the same to the decomposition temperature thereby producing a product comprising a mixture of $M'Fe_2O_4$ with one or both of $\gamma$-$Fe_2O_3$ and $\alpha$-$Fe_2O_3$,
    thermally treating the said product at a temperature at least equal to 700° C. but not greater than 1000° C. and maintaining this temperature for a period of time sufficient to form hexaferrite;
    cooling the resulting thermally treated product, and washing the resulting particles with an aqueous solution of an acid capable of dissolving monoferrites of the type $M'Fe_2O_4$ that are formed so as to remove said monoferrites.

2. The process of claim 1 wherein said particulate mixture contains from 0.14 to 0.25 mole of metal M' per mole of iron.

3. The process of claim 1 wherein the particles of said particulate mixture have an acicular ratio lower than 3.

4. The process of claim 1 wherein the particles of said particulate mixture have an acicular ratio not greater than 2.

5. The process of claim 1 wherein in the step of decomposing the organic salts the salts are heated at a rate of from 10°-20° C./hour.

6. The process of claim 1 wherein in the thermal treatment step the product is heated at a rate of from 100°-200° C./hour.

7. The process of claim 1 wherein said salt of an organic acid is a salt of an organic acid selected from acetic acid, formic acid, oxalic acid, citric acid and tartaric acid.

8. The process of claim 1 wherein the said acid capable of dissolving monoferrites of the type $M'Fe_2O_4$ is hydrochloric acid.

9. The process of claim 1 wherein said particulate mixture also contains at least one dopant based on a divalent metal.

10. The process of claim 9 wherein said divalent metal is selected from Co, Ni, Cu and Zn.

11. The process of claim 9 wherein said dopant is present in the form of a salt of an organic acid.

12. The process of claim 1 wherein the hexaferrite is doped with ferrous iron, and the thermal treating step is carried out in a reducing atmosphere so as to transform a portion of ferric iron to ferrous iron.

13. The process of claim 1 wherein the preparation of the said particulate mixture of salts of organic acid by coprecipitation comprises
    preparing a solution containing soluble salts of divalent iron and metal M', the total concentration of said salts being greater than 1 mole/liter,
    preparing a solution containing 1-2 moles/liter of organic acid in an organic solvent or in a mixture of water and an organic solvent,
    pouring, with stirring, the said solution of salts into said solution of organic acid and
    recovering the precipitate formed.

14. The process of claim 13 wherein said solution of soluble salts of divalent iron and metal M' contains from 0.50 to 0.65 mole of metal M' per mole of iron.

15. The process of claim 13 wherein said solution of soluble salts also contains at least one soluble salt of a dopant metal.

16. The process of claim 15 wherein said dopant metal is a divalent metal.

17. The process of claim 16 wherein said divalent metal is Co, Ni, Cu or Zn.

18. The process of claim 13 wherein said soluble salt is selected from a chloride, a nitrate, a formate or an acetate.

19. The process of claim 13 wherein said solution containing soluble salts is a solution in water or in an organic solvent selected from methanol, ethanol, tetrahydrofuran and a polyol liquid at ambient temperature, or in a mixture of water and said organic solvent, the said solution being optionally acidified to assist the solubilization of said salts.

20. The process of claim 13 wherein said organic solvent in which is dissolved the said organic acid is selected from ethanol, 1-propanol, isopropanol, butanol, acetone, or mixture thereof, with optionally a small amount of water.

21. The process of claim 1 wherein the excess of metal M' is such that the decomposition step yields stabilized $\gamma$-$Fe_2O_3$ having a temperature of transformation into $\alpha$-$Fe_2O_3$ greater than the formation temperature of hexaferrite and wherein the thermal treating step is effected at a temperature lower than the said transformation temperature and that the thermal treating step is terminated before the complete disappearance of the $\gamma$-$Fe_2O_3$ phase so as to obtain particles having a $\gamma$-$Fe_2O_3$ core.

22. A process for preparing hexaferrite particles of the type $M'Fe_{12}O_{19}$, optionally modified by at least one dopant agent based on a divalent metal selected from the group consisting of Co, Ni, Cu and Zn, wherein M' represents at least one metal selected from the group consisting of barium calcium, strontium and lead, said process comprising
    preparing a particulate mixture of a ferrous salt of an organic acid and a salt of an organic acid with at least one metal M' by coprecipitation, optionally in the presence of said dopant, the particles resulting from said coprecipitation having a size not greater than about 0.5 μm, the said mixture containing a stoichiometric excess of the salt of metal M' and containing from 0.14 to 0.30 mole of metal M' per mole of iron, said organic acid being selected from the group consisting of acetic acid, formic acid, oxalic acid, citric acid and tartaric acid,
    decomposing the resulting organic acid salts by heating the same to their decomposition temperature whereby producing a product comprising a mixture of M'Fe$_2$O$_4$ with one or both of γ-Fe$_2$O$_3$ and α-Fe$_2$O$_3$, thermally treating the said product at a temperature at least equal to 700° C. but not greater than 1000° C. and maintaining this temperature for a period of time sufficient to form hexaferrite, cooling the resulting thermally treated product and, washing the resulting particles with an aqueous solution of an acid capable of dissolving monoferrites of the type M'Fe$_2$O$_4$ that are formed so as to remove said monoferrites.

* * * * *